United States Patent [19]

Lefebvre et al.

[11] 4,063,181

[45] Dec. 13, 1977

[54] POSITIVE SAFETY CONTROL DEVICE

[75] Inventors: Claude Lefebvre, Les Lilas; Jean-Paul Therond, Versailles, both of France

[73] Assignee: Commissariat a l'Energie Atomique, Paris, France

[21] Appl. No.: 637,432

[22] Filed: Dec. 3, 1975

[30] Foreign Application Priority Data

Dec. 11, 1974  France ................ 74.40768

[51] Int. Cl.$^2$ ............................................. H03B 3/02
[52] U.S. Cl. .................................... 328/147; 307/308; 307/358; 328/149
[58] Field of Search ............... 328/146, 147, 148, 149, 328/150, 115, 116, 117; 307/235 F, 235 G, 235 J, 235 N, 308; 73/88.5; 317/42; 323/89 B

[56] References Cited

U.S. PATENT DOCUMENTS 3,657,660  4/1972  Pfersch ................................ 328/148

*Primary Examiner*—John Zazworsky
*Assistant Examiner*—Marcus S. Rasco
*Attorney, Agent, or Firm*—Sughrue, Rothwell, Mion, Zinn and Macpeak

[57] ABSTRACT

In a nuclear reactor protection system, the control device initiates reactor shutdown when the amplitude of a voltage signal delivered by a detector oversteps a range limited by two adjustable values. The device comprises a stabilized supply, a detector supplied by a rectifier for delivering a d.c. voltage having an amplitude Ve which is proportional to the value of the signal to be measured, two generators for producing d.c. voltages of opposite sign having amplitudes Vd and Vref, and an adjustable voltage divider which delivers a periodic rectangular-wave voltage having an amplitude Vs. The detector output voltage is compared with the algebraic sum of the values Vd, Vref and Vs by means which produce a voltage level of O if the amplitude Ve is outside the range (Vd + Vref, Vd + Vref + Vs) and a voltage level of +1 if the amplitude Ve is within said range.

10 Claims, 5 Drawing Figures

POSITIVE SAFETY CONTROL DEVICE

The present invention relates to a positive-safety control device for producing action when the value of the amplitude of a signal delivered in the form of voltage and especially by a detector is located outside a range limited by two adjustable values.

The invention is integrated especially in the protection system of a nuclear reactor; in this protection system, it is desired to initiate the dropping of safety absorbers under gravity into the reactor core when the value of one or a number of physical quantities deviates from a reference value to an appreciable extent, In the application which is concerned with the operation of nuclear reactor control rods, the N physical input quantities are, for example, pressure, temperature or neutron flux, a sample of which is taken at N different points within the reactor.

The extreme precautions which must necessarily be taken in reactor protection systems dictate the need for a very high standard of operational safety and reliability of electronic control devices. With this objective, it is an advantage to provide control systems which are designed to ensure "intrinsic" positive safety.

The positive safety concept is well known to specialists who are faced with the safety problem; it is understood to mean the ability of a material to undergo a change which tends to initiate the action for which it has been designed in the event of "safe" fault conditions which affect said material. The application to initiation of emergency shutdown of a nuclear reactor is presented by way of example. In the case of industrial materials in common use, the "safe" fault rate is of the same order of magnitude as the "unsafe" fault rate. The device in accordance with the invention has an appreciably reduced unsafe fault rate whereas the safe fault rate remains of the same order of magnitude. Unsafe faults are fault occurrences which do not lead to the desired protective action in the event of over-stepping of the threshold value in respect of one of the physical parameters of the protection system. In accordance with the invention, the unsafe fault rate is approximately 100 times lower at absolute value than that of industrial materials in common use; this result is achieved without any appreciable increase either in the cost or in the dimensions of electronic circuitry.

In more precise terms, the invention is concerned with a positive-safety control device which is employed for ensuring that the value of the amplitude of a signal delivered in the form of voltage by a detector is within a range limited by two adjustable values, namely the value of the voltage at which the device delivers a direct-current output voltage having the value +1, said device being such as to deliver the output value O in respect of any other value of the signal outside said range of values or in the event of any failure of an element of the circuit.

In one embodiment of the invention, the voltage delivered by the detector is a direct-current voltage but it remains apparent that the detector can just as readily operate in periodic current and deliver a periodic voltage.

The device comprises:

a stabilized supply A which delivers a periodic voltage such as for example a rectangular-wave voltage of constant amplitude, a rectifier R connected to the secondary winding of an electrical isolation transformer $Ta$ whose primary winding is supplied with the voltage delivered by the supply A, said rectifier R being such as to deliver a direct-current voltage, a detector which is supplied with direct-current voltage through the rectifier R and delivers a direct-current voltage having an amplitude $Ve$ which is proportional to the value of the signal to be measured, two generators for producing direct-current voltages of opposite sign $Vd$ and $Vref$, the inputs of said generators being supplied with the voltage induced in a secondary winding of the transformer $Ta$, an adjustable voltage divider which is connected to the secondary winding of the electrical isolation transformer $Ta$ and delivers a periodic rectangular-wave voltage having an amplitude $Vs$, means for comparing the voltage $Ve$ with the algebraic sum of three voltages consisting of the two direct-current voltages having amplitudes $Vd$ and $Vref$ and the periodic rectangular-wave voltage $Vs$ and for delivering an output voltage S which is zero if the voltage $Ve$ is not comprised within the range ($Vd + Vref$, $Vd + Vref + Vs$) and equal to +1 if the output voltage is comprised within said range, means for electrically isolating, amplifying and rectifying the output voltage S.

By way of example, the detector is a strain-gage transducer or a platinum thermometer probe mounted in a Wheatstone bridge, or a thermocouple.

The conversion of direct-current values to alternating-current values for various electronic operations in the circuit offers a larger number of advantages. In the first place, this conversion permits the use of electrical isolation transformers so that, if a fault condition gives rise to failure of one portion of said circuit, it is a so-called "safe" fault and does not have any adverse effect on other portions or result in further failures. In the second place, alternating-current operation permits continuous testing of the entire device at a frequency which is equal to the frequency of the alternating current, for example 1 Kc/s. It is readily apparent that the periodic voltage delivered by the supply A and chosen in accordance with the invention so as to have a rectangular waveform can in fact have any desired waveform such as square waves, triangular waves or even sinusoidal waves without thereby departing from the scope of the invention.

In one embodiment of the invention, the device also comprises a circuit for processing the direct-current voltage of the detector output $Ve$ and delivers an analog output signal. Said processing circuit comprises at least one variable-gain amplifier whose input is connected to the output of the detector, a modulator-demodulator isolation assembly supplied through the secondary winding of the electrical isolation transformer $Ta$, the primary winding of which is fed by the supply A and follower amplifiers having a low output impedance connected in series with the modulator-demodulator assembly.

The variable gain of the amplifier makes it possible to operate within a voltage range at the output of the amplifier which is independent of the variations of characters of the detector, this being achieved by matching the gain with the precise characteristics of the detector.

It is an advantage in some configurations to include a matching circuit between the detector signal amplifier and the modulator-demodulator in order to reverse the voltage-signal characteristic curve of the detector. In fact, the assembly consisting of the detector and the amplifier or amplifiers produces an electrical signal which increases as a function of the increase in the physical quantity. In some applications, it is an advantage to have a signal which is symmetrical with this latter, the value of the voltage being inversely proportional to the value of the physical quantity. The advantage thereby achieved is that, if operations are performed in negative logic by comparing the value of the signal with a low reference value, a trip takes place when the physical quantity is at a maximum value. If the values of the voltage are plotted as ordinates and the value of the physical quantity is plotted as abscissae, the matching circuit exchanges the ordinates and the abscissae so as to produce another electrical signal whose output value decreases when the physical quantity increases. The modulator-demodulator (or synchronous rectifier) isolates the analog outputs from the upstream circuit. By reason of the low output impedances of the follower amplifiers, any possible short-circuit of one of the amplifiers is not liable to disturb the signals delivered by all the others. These amplifiers have a gain which is equal to unity and have an impedance-matching function while also serving as additional isolators.

The device in accordance with the invention is so designed that the failure of a single element of the circuit automatically results in a safe fault condition whereas only the simultaneous failure of several elements is liable to result in an unsafe fault condition.

Further characteristic features and advantages of the invention will become apparent from the following description of exemplified embodiments which are given by way of explanation without any limitation being implied, reference being made to the accompanying drawings, wherein.

Figure 4:
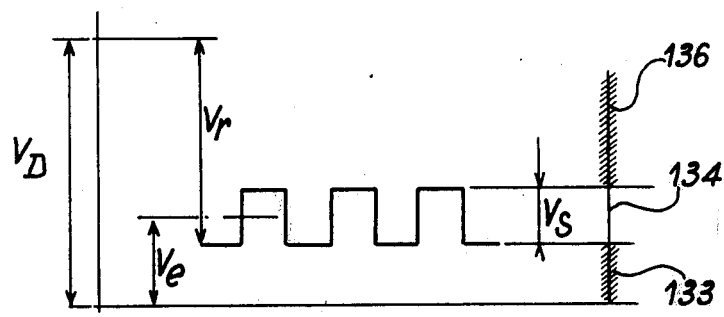
Figure 3:
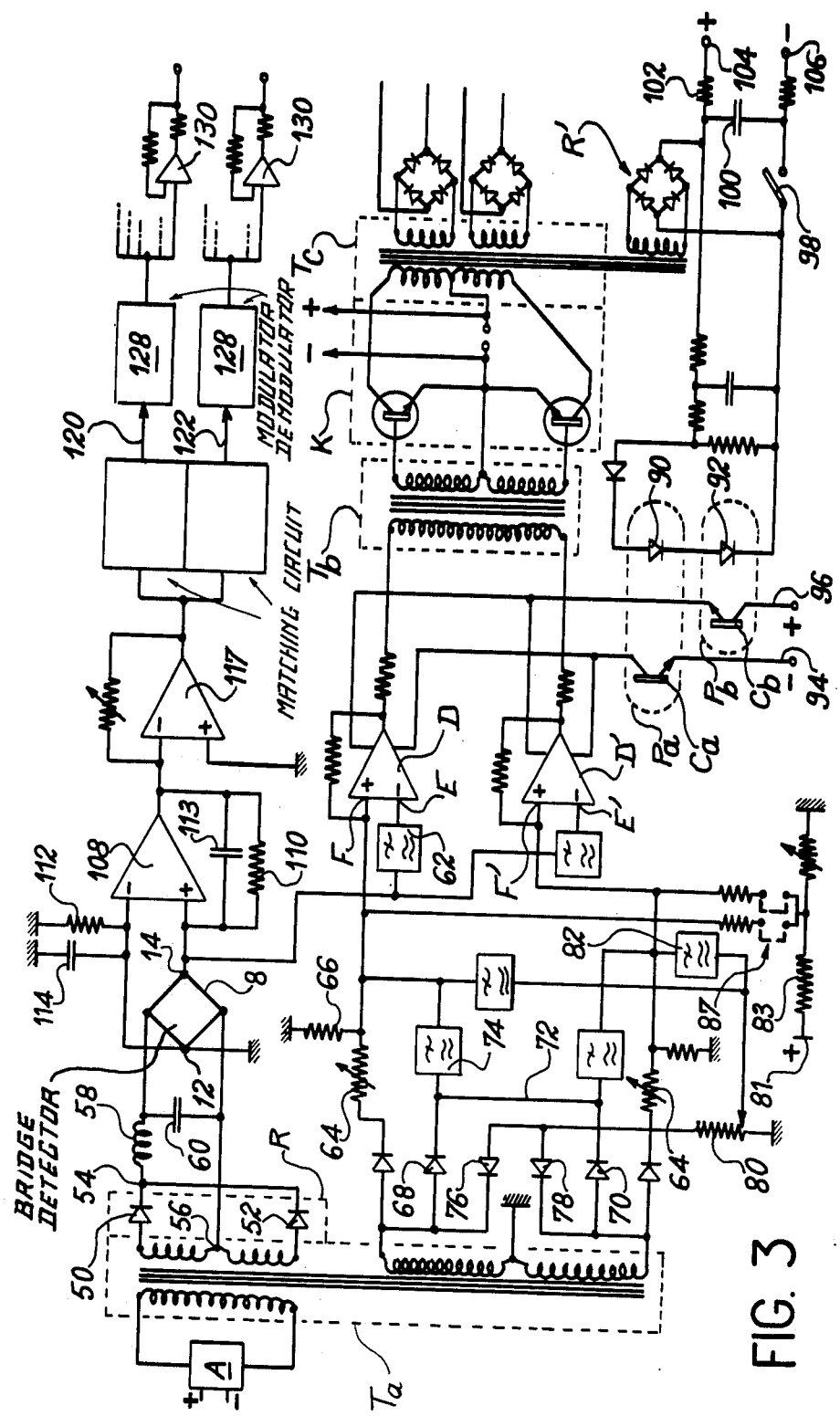
Figure 3:
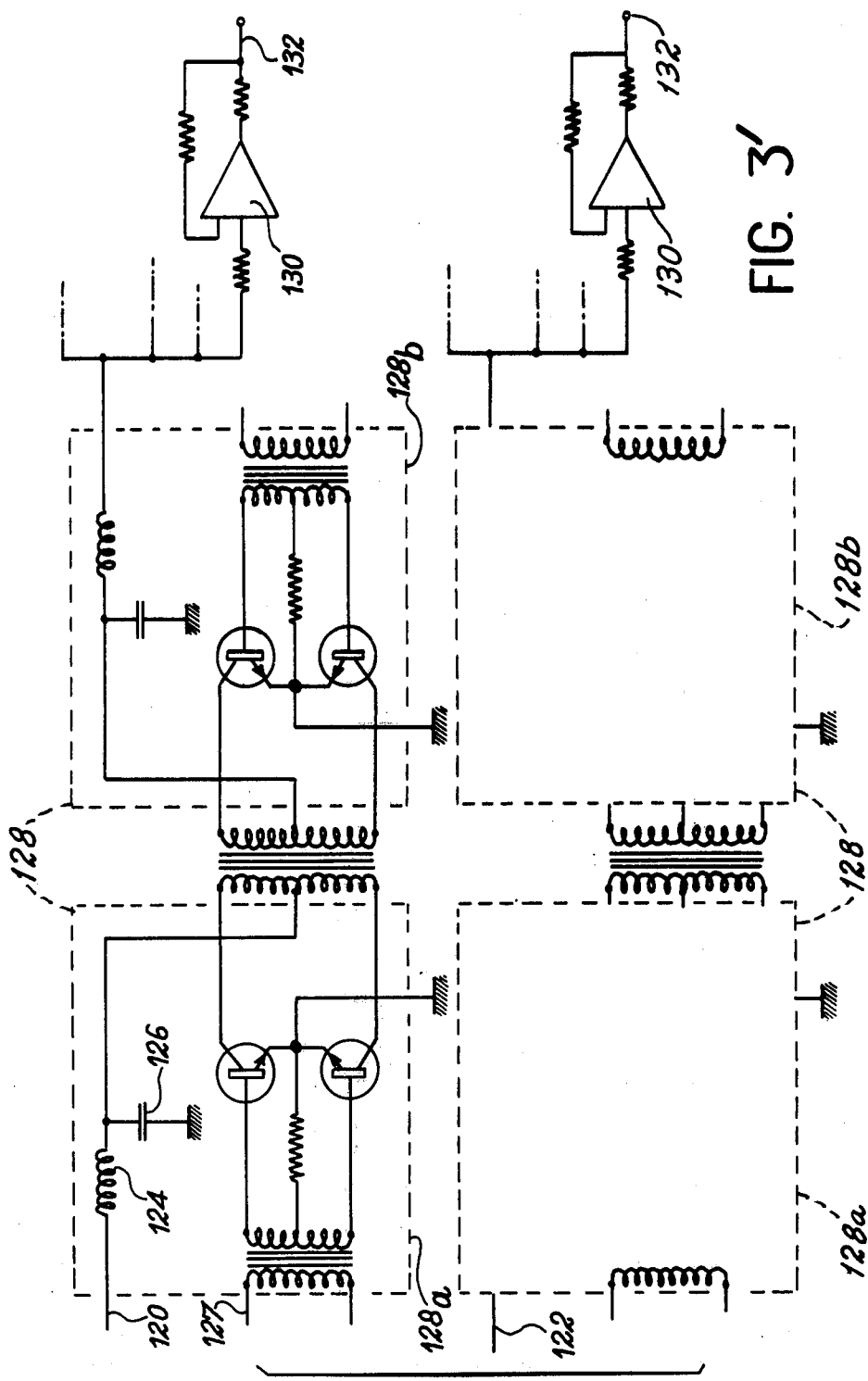

FIGS. 3 and 3' are electronic diagrams of the device in accordance with the invention;

FIG. 4 is a diagram of the different voltages which define the normal operating zone.

Figure 1:
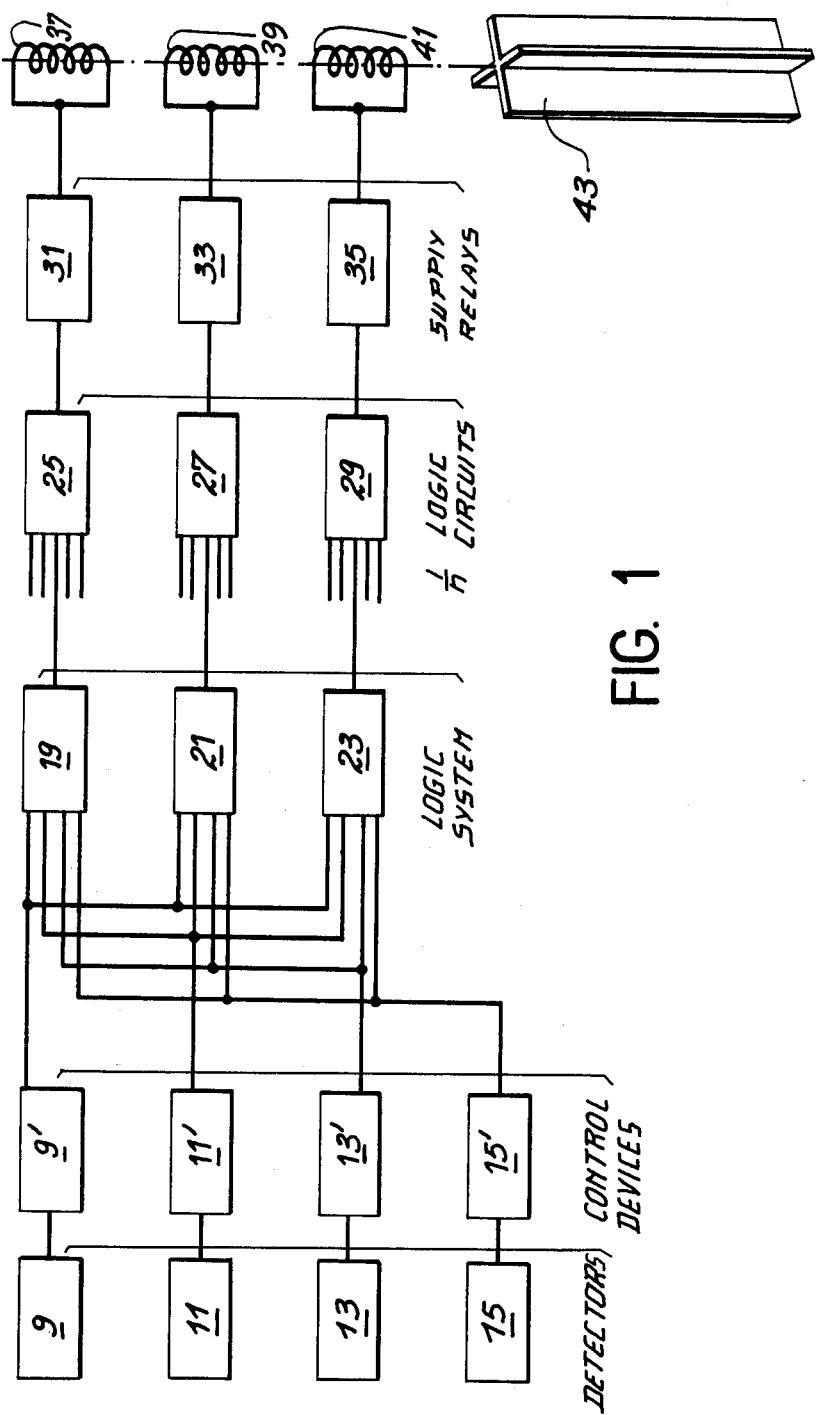
FIG. 1 is a general block diagram of the protection and control system to which the invention applies.

There is shown in FIG. 1 a block diagram of the device for controlling safety absorbers, to which the control device in accordance with the invention is applicable. There are shown at 9, 11, 13 and 15 four detectors for measuring the same physical parameter such as temperature, for example. The signals delivered by these four detectors (in the case of the figure) are fed into the units 9', 11', 13' and 15' representing the positive-safety control devices according to the invention. The signals emitted by said detectors are fed into the units 19, 21 and 23 representing the "three out of four" logic systems, said units being each connected to four pairs of detectors and control devices. In general, only three channels are connected and this makes it possible, if so desired, to disconnect a detector/control device pair which is in service and to replace this latter by another pair of the same series for purposes of testing or recalibration. The logic circuits operate in "two out of three" coincidence. The 1/n logic circuits such as 25, 27 and 29 each produce a trip order by means of the direct-current logical signals delivered by the control units such as the unit 19. The different inputs of the logic circuits 1/n are connected to measuring systems and units for controlling different physical parameters (neutron flux, pressure, temperature and the like). The output signals of the logic circuits control the supply relays 31, 33 and 35 of the coils 37, 39 and 41. These relays can be of the type described in the copending patent application filed Dec. 3, 1975 under Ser. No. 637,438. During normal operation, the safety absorber is in the top position, that is, outside the reactor core. When two coils out of three are no longer supplied by the relays, the safety absorber 43 drops, thus permitting emergency shutdown of the reactor (2 out of 3 redundancy).

Figure 2:
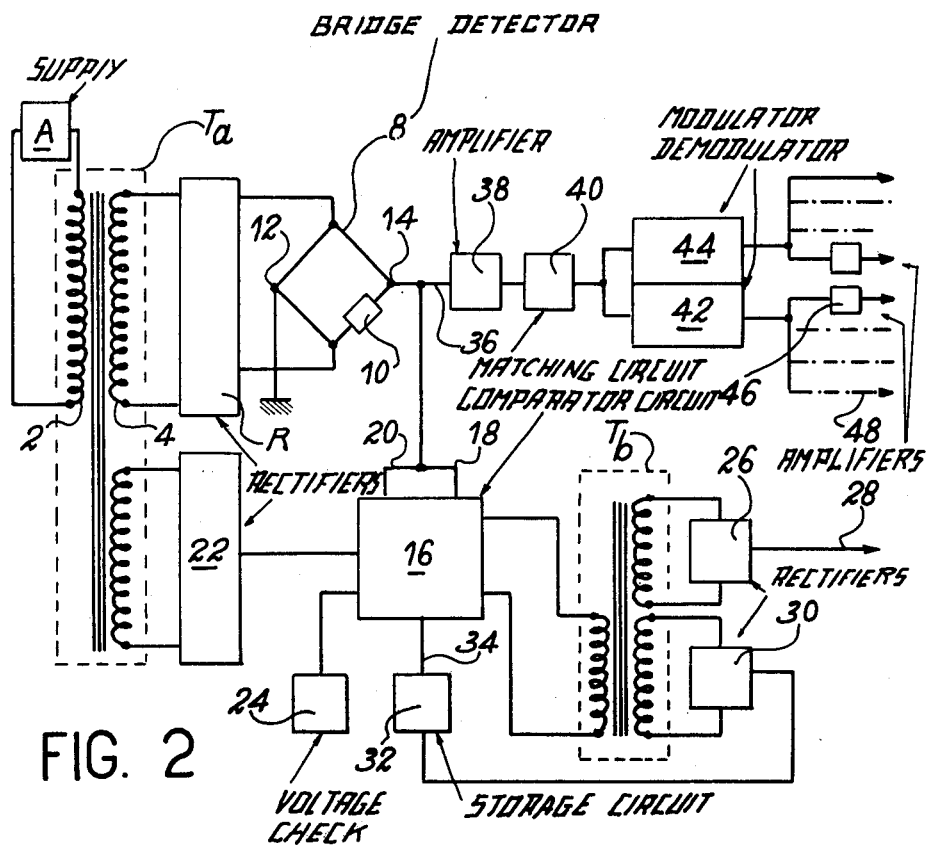
FIG. 2 is a general block diagram of the device in accordance with the invention.

There is shown in FIG. 2 a general arrangement or block diagram of the device in accordance with the invention. The supply A delivers a periodic rectangular-wave voltage to the terminals of the primary winding 2 of the electrical isolation transformer Ta. A current rectifier R is connected to the terminals of one of the secondary windings 4 of the transformer Ta; at the output of said rectifier, a direct-current voltage having an amplitude equal to that of the alternating-current voltage delivered by the supply A is applied to two opposite terminals of a bridge detector 8. Said detector can be either a strain-gage transducer or a thermistance-type temperature-measuring detector 10 which is placed on one of the arms of the bridge. Any variation in the physical quantity measured results in unbalance of the bridge and this unbalance is represented by a direct-current potential difference between the ground 12 and the opposite end of the bridge 14. Said voltage is fed into the comparator circuit 16 via two channels 18 and 20 which provide "one out of two" redundancy, thus reducing the unsafe fault rate. There is also introduced into said comparator 16 a direct-current voltage which is obtained after rectification in the rectifier 22 and which is derived from a secondary winding of the transformer Ta, the primary winding of which is fed from the supply A.

A circuit for checking the offset voltage of the differential amplifiers contained in the comparator unit 16 is represented by the block 24. The primary winding of an isolation transformer Tb is connected to the output of the comparator 16. The secondary windings of said transformer are connected to rectifiers such as 26 which produce a logical signal 28 having a value +1 when, as will become apparent hereinafter, the direct-current signal delivered by the detector is located within the permitted zone and which produce a signal O when the signal delivered by the detector is located outside this range or when a failure occurs in any element of the circuit. A second rectifier 30 connected to the terminals of the secondary winding of the transformer Tb transmits a direct-current supply signal to a storage circuit 32 which supplies the comparator 16 via the lead 34.

The channel 36 which is connected to the output of the detector is employed for delivering at the output an analog signal which is proportional to the indication of the detector. The signal on the channel 36 is fed into an amplifier circuit 38, passes through one or a number of matching circuits such as 40, then passes through two modulators-demodulators 42 and 44 connected in parallel, the outputs of said modulators/demodulators being connected to follower amplifiers such as 46 which are connected in parallel. There is obtained on the output such as 48 an analog signal which is proportional to the signal delivered by the detector.

There is shown in FIG. 3 a detailed electronic diagram of one embodiment of the device according to the invention. As in the diagram of FIG. 1, the primary winding 2 of the transformer Ta is connected to a supply A. The rectifier R is made up of a bridge constituted by the diodes 50 and 52 which are mounted in opposition, the summits of like polarity of the two diodes being connected to a common point 54. The direct-current voltage is developed between the terminal 54 and the mid-point 56 of the secondary winding of the transformer Ta. This direct-current voltage is transmitted via a low-pass filter constituted by an inductance coil 58 and a capacitor 60 to the opposite terminals of a detector 8. The voltage Ve developed between ground and the terminal 14 of the detector is fed into the two inputs E and E' of the differential amplifiers D and D'. Low-pass filters such as the filter 62 are interposed in order to suppress voltage peaks. The voltage Vs obtained at the output of the voltage divider constituted by the variable resistor 64 and fixed resistor 66 is applied to the terminal F of the amplifier D; the same type of voltage divider formed of resistors 64 and 66 delivers an equal voltage to the terminal F' of the amplifier D'.

A first direct-current voltage generator is formed by the secondary winding of the transformer Ta and the diode bridge constituted by the diodes 68 and 70 which are connected to each other by means of the lead 72. This voltage or so-called shift voltage Vd is applied to the terminals F and F' of the differential amplifiers D and D' through low-pass filters such as the filter 74. A second generator which imposes an adjustable direct-current voltage Vref of opposite sign to the voltage Vd is constituted by the secondary winding of the transformer Ta, and the diodes 76 and 78 which are mounted in opposition, the poles of like sign being connected to ground through a resistor 80. This voltage is applied to the terminals F and F' of the amplifiers D and D' via low-pass filters such as the filter 82. The absolute values of the voltages Vref and Vd are equal respectively to approximately two to three times the maximum value of the voltage Ve so as to ensure that, in the event of failure of either generator, the voltage applied to the differential amplifiers is distinctly outside the permitted zone.

The outputs of the amplifiers D and D' are connected to the terminals of the primary winding of the transformer Tb. A synchronous amplifier K connected to the secondary winding of the electrical isolation transformer Tb feeds a signal into the primary winding of the isolation transformer Tc. The rectifiers such as R' are connected to the secondary windings of the electrical isolation transformer Tc. In the case of FIG. 3, said rectifiers are bridges comprising four diodes. There is also shown in this figure the circuit for checking the offset voltage of the amplifiers D and D'. This circuit comprises a positive-voltage source 81, a voltage divider constituted by the resistors 83 and 85 and leads for connecting the positive-voltage source to the inputs F and F' of the amplifiers D and D' by means of connections 87.

The circuit further comprises a memory or storage circuit connected to the terminals of the rectifier R' and comprising two photo-couplers Pa and Pb; each photo-coupler consists of photo-emitters 90 and 92 placed opposite to the photo-receivers Ca and Cb. Said photo-receivers Ca and Cb serve respectively to connect the supplies of the amplifiers D and D' to a negative supply terminal 94 and to a positive supply terminal 96. When a signal appears at the terminals of the rectifier R', the photo-emitters (of photodiodes in this case) are supplied and the amplifiers D and D' are caused to operate. In the event of failure or over-stepping of the voltage Ve beyond the permitted zone, no signal appears any longer on the rectifier R' and the circuit is blocked since the amplifiers D and D' are no longer supplied. In order to put the device back into operation, the switch 98 is actuated; by means of a capacitor 100 and a resistor 102, said switch connects the photodiodes in series to a direct-current voltage source which is placed between the terminals 104 and 106. The time constant of the resetting circuit RC (resistor 102 and capacitor 100) is of the order of 1 second. The direct-current voltage source is advantageously replaced by the rectified voltage which appears at the secondary of the transformer Ta.

The circuit which is illustrated further comprises a signal-processing unit constituted by a first amplifier 108 having a fixed gain determined by resistors 110 and 112 which also perform the function of low-pass filter by virtue of the presence of the capacitors 113 and 114. The output of said amplifier is connected to the input of a variable-gain differential amplifier 117. The output of said amplifier is connected to two inputs of two matching circuits which deliver at 120 and 122 signals of normal or reversed slope as explained earlier. At the output 120, the direct-current signal is fed into a modulator-demodulator assembly such as 128, the output of which is connected to follower amplifiers 130.

FIG. 3' shows in detail in the case of an output channel 120 the modulator-demodulator 128 which is composed of a modulator 128a and of a demodulator 128b. The direct-current signal at 120 is transmitted via a low-pass filter formed of an inductance coil 124 and of a capacitor 126 to a modulator 128a. The circuit 128a of FIG. 3' represents a modulator of conventional type supplied from a secondary winding 127 of the transformer Ta. The demodulator 128b delivers a direct-current output signal which is equal to the direct-current input signal 120 but isolated electrically with respect to this latter. Said signal is transmitted to a follower amplifier such as 130 having a gain of unity and a low output impedance. The output signal at 132 is proportional to the voltage Ve delivered by the detector 8.

The operation of the device will be more fully understood by referring to FIG. 4 which shows the shift voltage Vd obtained by the first generator which is connected to the terminals of the secondary winding of the transformer Ta and which was described earlier. The voltage Vref of opposite sign to that of the voltage Vd is added algebraically to the voltage Vd at the terminals F and F' of the operational amplifiers D and D'. At the same terminals, there is added the periodic voltage Vs obtained from the voltage delivered by the supply A through the resistive voltage divider (resistors 64 and 66). The sum of the three voltages Vd, Vr and Vs defines the permitted zone 134 in which the direct-current voltage Ve delivered by the detector can vary under normal operating conditions. When the voltage Ve is comprised within said zone 134, the voltage applied between the two terminals E and F of the amplifiers D and D' is an a.c. voltage, thus producing a non-zero positive output signal at the circuit output 28. When the voltage Ve is higher than the algebraic sum Vd + Vr + Vs, said voltage is located within the forbidden zone 136 and the transformer Tb is saturated, thus producing a "0" output logical signal. Similarly, in the forbidden zone 133, the transformer Tb is saturated by a current of opposite sign. The voltages Vr and Vs can be varied by means of the resistors 64 and 80 of FIG. 3.

It is apparent from a careful study of FIG. 3 that, in the event of any failure of one element of the electronic circuit shown in this figure, the signal at the output of the transformer Tc has the value O. For example, if the photo-receiver Pa is damaged and remains in the non-conducting state, the differential amplifier D is no longer supplied and the transformer Td produces a zero signal at the secondary. If one of the differential amplifiers is short-circuited, the transformer Tb is saturated and its secondary winding does not deliver any signal. Similarly in the case of interruption of the supply A and failure of a current rectification diode, no signal is developed at the secondary of the transformer Tb. This is not by any means a comprehensive list of safe fault conditions. Moreover, as has already been mentioned, the electrical isolation transformers such as the transformers Ta, Tb, Tc isolate the different parts of the circuit and make them independent from each other.

It has been established that the unsafe fault rate, namely the rate of faults which produce an output signal having the level O and resulting from faulty operation, is lower than $5 \times 10^{-7}$/hour. The analog signals which are proportional to the signal delivered by the detector make it possible to produce corrective action for regulation or display whilst monitoring of the detector improves the unsafe fault rate and also make it possible to produce a safety order.

It should be clearly understood that the present invention is not limited to the example of construction described in the foregoing but extends on the contrary to all alternative forms which remain within the definition of equivalent means, especially for the electronic performance of the different functions of comparison between a direct-current signal, an alternating-current signal and the signal delivered by the detector.

What we claim is:

1. A positive-safety control device for producing action when the value of a signal delivered in the form of direct-current voltage by a detector is located outside a range limited by two adjustable values, namely the value of voltage at which the device delivers a direct-current output voltage having the logic value +1, said device being such as to deliver the output logic value 0 in respect of any other value of the signal outside said range of values or in the event of any failure of an element of the circuit, wherein said device comprises:

a stabilized supply which delivers a periodic rectangular-wave voltage of constant amplitude, a rectifier connected to a secondary winding of an electrical isolation transformer whose primary winding is supplied with the voltage delivered by the supply said rectifier being such as to deliver a direct-current voltage, a detector which is supplied with direct-current voltage through the rectifier and delivers a direct-current voltage having an amplitude Ve which is proportional to the lvalue of the signal to be measured, two generators for producing direct-current voltages of opposite sign Vd and Vref, the inputs of said generators being supplied with the voltage induced in the secondary winding of the transformer an adjustable voltage divider which is connected to the secondary winding of the electrical isolation transformer and delivers a periodic rectangular-wave voltage having an amplitude Vs, means for comparing the voltage Ve with the algebraic sum of three voltages consisting of the two direct-current voltages having amplitudes Vd and Vref and the periodic rectangular-wave voltage Vs and for delivering an output voltage S which is zero if the voltage Ve is not comprised within the range (Vd + Vref, Vd + Vref + Vs) and equal to +1 if the output voltage is comprised within said range, means for electrically isolating, amplifying and rectifying the output voltage S.

2. A device according to claim 1, wherein said device comprises a circuit for processing the direct-current output voltage Ve of the detector and said circuit has analog outputs comprising:

at least one variable-gain amplifier whose input is connected to the output of the detector, a modulator-demodulator assembly supplied through the secondary winding of the electrical isolation transformer whose primary winding is fed by the supply, follower amplifiers having a low output impedance connected in series with the modulator-demodulator assembly.

3. A device according to claim 1, wherein the rectifier is constituted by two diodes mounted in opposition at the ends of the secondary winding of the electrical isolation transformer, the poles of like sign of the two diodes being connected to a common terminal whilst another terminal is connected to the mid-point of said secondary winding and a direct-current voltage having an amplitude equal to the alternating-current voltage of the secondary winding of the transformer appears between the two terminals.

4. A device according to claim 1, wherein the direct-current voltage generators are diode bridges each constituted by two diodes in opposition which are connected to the ends of the secondary winding of the transformer, the direct-current voltage being obtained between the ground connected to the mid-point of the secondary winding of the transformer and a point located between the two poles of like polarity of the two diodes.

5. A device according to claim 1, wherein the means for comparing the voltage Ve with the algebraic sum of the voltages Vd + Vref + Vs consist of two differential amplifiers in parallel, one input of each amplifier being connected to the output of the detector which delivers the direct-current voltage Ve and the other input of each differential amplifier being connected to the voltage divider which delivers the voltage Vs as well as to the outputs of the direct-current voltage generators, and leads which connect the outputs of the two amplifiers to the primary winding of another isolation transformer.

6. A device according to claim 5 which further comprises a means for checking the offset voltage of the differential amplifiers, wherein said checking means is constituted by a switch for connecting the positive-polarity inputs of the two amplifiers to a source of positive voltage of adjustable value.

7. A device according to claim 5, wherein the secondary winding of the other isolation transformer is connected by means of a synchronous amplifier supplied from a direct-current voltage source to the primary winding of a third isolation transformer having a secondary winding connected to another rectifier.

8. A device according to claim 1, wherein said device comprises a storage circuit composed of two photo-couplers, each photo-coupler being composed of a photo-emitter and a photo-receiver, one photo-receiver being such as to connect a positive voltage supply terminal to two differential amplifiers, the other photo-receiver being such as to connect a negative voltage supply terminal to said two differential amplifiers and the two photo-emitters being supplied in parallel with a voltage obtained from a rectifier and with a direct-current voltage produced by a storage battery which is connectable by means of a resetting push-button.

9. A device according to claim 2, wherein the analog output circuit for processing the output voltage $Ve$ of the detector comprises two series-connected amplifiers consisting of an operational amplifier having a constant gain and a shaping amplifier having a variable gain.

10. A device according to claim 9, wherein said device comprises a matching circuit for reversing the voltage-signal characteristic curve of the detector, said circuit being placed in series between the shaping amplifier and the modulator-demodulator.

* * * * *